US005428220A

United States Patent [19]

Ehara

[11] Patent Number: 5,428,220

[45] Date of Patent: Jun. 27, 1995

[54] AEROSOL MASS SPECTROMETER AND METHOD OF CLASSIFYING AEROSOL PARTICLES ACCORDING TO SPECIFIC MASS

[75] Inventor: Kensei Ehara, Ibaraki, Japan

[73] Assignee: The United States of America as represented by the Secretary of Commerce, Washington, D.C.

[21] Appl. No.: 158,568

[22] Filed: Nov. 29, 1993

[51] Int. Cl.$^{6}$ ........................ B01D 59/00; B04B 1/04; H01J 47/00

[52] U.S. Cl. .................................... 250/281; 250/288; 494/44; 494/900

[58] Field of Search ........................ 250/281, 288, 289; 494/10, 44, 900

[56] References Cited

U.S. PATENT DOCUMENTS

| | | | |
|---|---|---|---|
| 3,683,626 | 8/1972 | Merrill | 60/279 |
| 3,780,937 | 12/1973 | Tahara et al. | 233/24 |
| 3,845,300 | 10/1974 | Roehling et al. | 250/282 |
| 3,860,167 | 1/1975 | Lascoux | 233/22 |
| 3,915,673 | 10/1975 | Tamai et al. | 494/44 |
| 3,971,510 | 7/1976 | Morse | 494/44 |
| 3,998,610 | 12/1976 | Leith | 494/44 |
| 4,030,897 | 6/1977 | Pelzer et al. | 494/900 |
| 4,031,397 | 6/1977 | Cardillo | 250/423 P |
| 4,108,354 | 8/1978 | Madsen | 494/900 |
| 4,182,480 | 1/1980 | Theyse et al. | 233/27 |
| 4,283,626 | 8/1981 | Siegel | 250/292 |
| 4,383,171 | 5/1983 | Sinha et al. | 250/282 |
| 4,458,148 | 7/1984 | Hirshfield | 250/281 |
| 4,818,864 | 4/1989 | Allemann | 250/291 |
| 4,977,785 | 12/1990 | Willoughby et al. | 250/288 |

OTHER PUBLICATIONS

W. C. Hinds, "Aerosol Technology, Properties, Behaviors and Measurement of Airborne Particle", John Wiley & Sons, New York, N.Y., pp. 302–305.

*Primary Examiner*—Jack I. Berman
*Assistant Examiner*—James Beyer
*Attorney, Agent, or Firm*—Jacobson, Price, Holman & Stern

[57] ABSTRACT

An aerosol mass spectrometer and method for classifying aerosol particles according to specific mass wherein an outer cylinder (1) and an inner cylinder (14) are concentrically and radially spaced relative to each other to provide an annular operating space (24) between the cylinders for the passage therethrough of the sample aerosol. Outer cylinder 1 is mounted on rotor 2 to be rotatably driven thereby and has a bearing (6) at the upper end for supporting an aerosol inlet tube (8). The inner cylinder has upper and lower bearings (20, 22) in the upper and lower ends thereof for supporting an aerosol outlet tube (38). A voltage source (28) is connected between the inner and outer cylinders via brushes (30, 32) to produce a radially inward electrostatic force across the annular gap (24) to oppose centrifugal force on the particles during rotation of the cylinders. The sample aerosol flows into the apparatus through the inlet tube and passes downwardly through the operating space between the cylinders and outwardly through an outlet tube (10). At least one insulating partition (26) is provided in the operating space to establish linear or laminar aerosol flow in the axial direction. The combination of the electrostatic and centrifugal forces makes it possible to classify particles according to specific mass and thereby according to particle mass.

21 Claims, 3 Drawing Sheets

OPERATING CHARACTERISTICS (r1 = 50mm & $\tau_2$ = 51mm)

AEROSOL MASS SPECTROMETER AND METHOD OF CLASSIFYING AEROSOL PARTICLES ACCORDING TO SPECIFIC MASS

BACKGROUND OF THE INVENTION

This invention relates to an aerosol mass spectrometer and a method for classifying aerosol particles according to specific mass. Specific mass for the purposes of this application is defined as the ratio of particle mass to particle electric charge and is related uniquely to mass in some practically important situations. Therefore, this device and method can also be used for mass analysis of aerosol particles.

It has been known to classify aerosol particles in various types of classifiers, including a differential mobility analyzer, cascade impactor, diffusion battery, conifuge and aerosol centrifuge. All of these types of classifiers classify particles according to their electrical or mechanical mobility or diffusion coefficient, from which particle size can be deduced. None of these devices are capable of classifying particles according to specific mass and thereby to particle mass.

U.S. Pat. No. 4,383,171 describes a system for analyzing particles in aerosols, such as in air pollution studies, which enables rapid chemical analysis of particles. A controlled stream of individual particles to be analyzed is vaporized and ionized while they move in free flight, for analysis by a mass spectrometer. The air with suspended particles moves through a capillary tube for producing a stream of particles which are passed through a skimmer device having a small opening spaced from an end of the capillary tube and a vacuum pump pumps air out of the space between the tube and the skimmer while further creating an inflow of air and particles through the capillary tube. A laser beam of sufficient intensity may be used for vaporizing and ionizing the particles while in free flight passing through the skimmer opening.

U.S. Pat. No. 4,977,785 describes a method and apparatus for introducing fluid streams into mass spectrometers and other gas phase detectors by generating an aerosol during decompression of a gas, liquid or supercritical fluid stream, the aerosol's properties being dependent upon mass flow, pressure, temperature, solubility of sample, and the physical dimensions of the aerosol generating device. After the aerosol is generated, a less volatile sample in the form of condensed particles is separated from the gaseous components by accelerating the aerosol through a nozzle restrictor and utilizing momentum differences between solute particles and carrier gas molecules to obtain high solute enrichments. The apparatus functions as an interface between a supercritical fluid chromatograph and the mass spectrometer.

Other methods and apparatus for analyzing by mass spectrometry are described in U.S. Pat. Nos. 4,283,626 and 4,818,864.

U.S. Pat. No. 3,780,937 describes a centrifugal gas separator having a vertically oriented centrifuge mounted on bearings within a stationary housing and driven by an electric motor in annular form having the stator portion thereof fixed to the stationary housing and the rotor portion thereof fixed to the centrifuge drum. When energized, the magnetic attraction between the stator and rotor portions tends to lift the centrifuge drum thereby reducing the weight supported by the bearings. Elastomagnetic devices may also be provided to dampen the vibration of the rotating centrifuge drum. A mixed gas to be isotopically separated is introduced into the drum through an inlet in the housing. The lower portion of the drum is heated and the upper portion is cooled to produce a temperature gradient across the drum axially for producing positive circulation of the mixed input gas in the drum. The centrifuging and the temperature gradient produces gas separation and the gas having a relatively light molecular weight is exhausted through orifices through the lower part of the drum and heavier molecular weight gases are exhausted through orifices in the upper part of the drum. The gas to be separated is inserted through one end of the drum for separation therein.

U.S. Pat. No. 3,860,167 describes a gas sampling device for a rotating bowl centrifuge having a cylindrical shell rotated at high speed concentrically around a hollow column and chambers at opposite ends in which are located scoops having sampling orifices for collecting the gas in the respective chambers.

U.S. Pat. No. 4,182,480 describes a gas centrifuge having a centrifuge rotor mounted inside a housing and driven by an electric motor at one end thereof. Gas enters the separating space within the drum and is separated into an outer layer of liquified gas at the inner surface of the drum and helium in the natural gas in gaseous form inside the drum, the separated components being drained off through separate means.

The above prior art is incorporated herein by reference.

BRIEF SUMMARY OF THE INVENTION

It is an object of this invention to provide a mass spectrometer and a method for classifying aerosol particles.

It is a further object of this invention to provide a method and apparatus for classifying particles according to particle mass by the utilization of a combination of electrical and centrifugal forces.

It is a still further object of the invention to provide an aerosol mass spectrometer having two rotatable concentric cylinders in radially spaced relationship and a voltage applied between the cylinders for the separation of aerosol particles fed to the annular gap between the cylinders.

The above objects are accomplished by the instant invention wherein two concentric cylinders are mounted in radially spaced relationship to provide a narrow annular operating space or gap therebetween, a voltage is applied between the cylinders so that the cylinders function as electrodes, an inlet feeds aerosol through one end of the outer cylinder for flow through the annular gap, and at least one insulating partition extending substantially parallel to the axis of rotation is provided in the annular gap for preventing rotation of the aerosol relative to the cylinder walls and establish laminar aerosol flow in the axial direction within the gap. With the cylinders rotated at the desired speed, voltage is applied across the cylinders to provide electrostatic force in the operating space between the cylinders in opposition to the centrifugal force on the particles so that aerosol passing through the operating space flows axially through the operating space, is selectively separated therein, and the separated particles are extracted from the lower portion through a coaxial outlet tube.

BRIEF DESCRIPTION OR THE DRAWINGS

The invention will now be described in greater detail with reference to the accompanying drawings wherein:

FIG. 1 is a perspective cross-sectional and partial schematic view of an embodiment of the invention;

FIGS. 2(*a*), 2(*b*) and 2(*c*) are enlarged partial views of the annular gap between the cylinders forming the operating space showing typical particle trajectories in the operating space in accordance with the invention;

DETAILED DESCRIPTION

Figure 1:
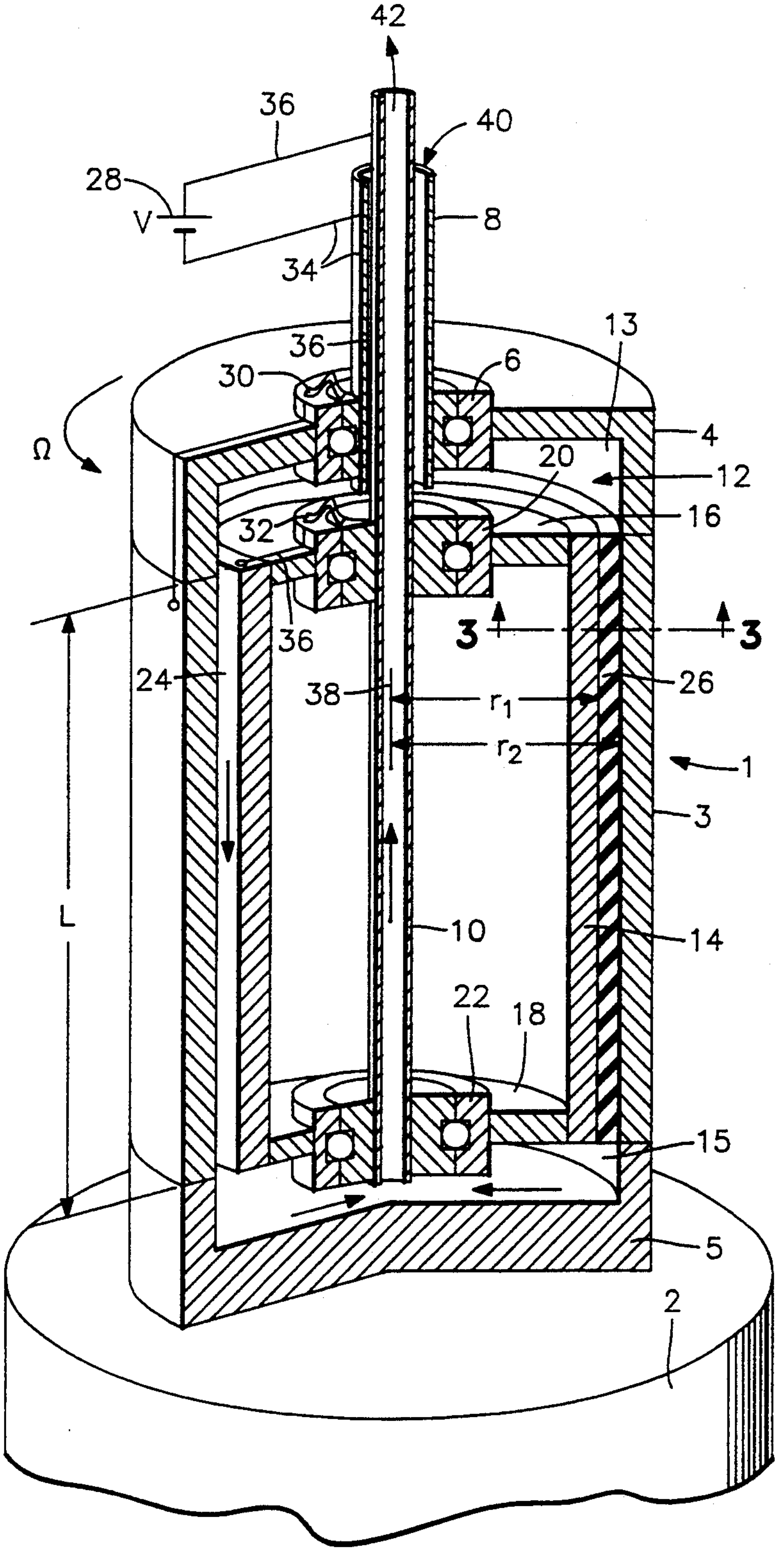

The apparatus of the invention as shown in FIG. 1 includes an outer cylinder 1 mounted on a rotor 2 which is operatively connected to a variable speed drive motor (not shown), or some other suitable means for rotating the rotor and varying the rotational speed thereof, so that the outer cylinder 1 is rotated by rotation of rotor 2. Outer cylinder 1 may be constructed as a plain cylindrical central portion 3 having an upper end portion 4 and a lower end portion 5 connected to the central cylinder portion 3 in a suitable manner such as by adhesive bonding or by screw fasteners, for example (not shown). Lower end portion 5 may be connected to rotor 2 by welding or other suitable fastening means such as screws or bolts, for example (not shown). Upper and lower end portions 4 and 5 are each dish shaped having an internal surface diameter the same or approximately the same as the internal diameter of central cylinder portion 3. Outer cylinder 1 may be made of some suitable material, such as a suitable metal (for example steel, stainless steel, brass or aluminum). The upper and lower end portions 4 and 5 may be made of some suitable electrical insulating material, such as teflon, ceramic, glass, or plastic. Alternatively, they may be made of a suitable metal, but in this case are connected to the central portion 3 in such a way that end parts 4 and 5 are electrically isolated from central part 3, such as by insulating material at the interface between the parts (not shown). In the center portion of upper end part 4 is mounted the outer race of a bearing 6, such as a ball bearing, for example, having an inner race connected at its inner surface to the outer surface of a tubular aerosol inlet member 8 for feeding sample aerosol into the mass spectrometer as will be described herein. Concentrically mounted within and in spaced relationship to tubular member 8 is aerosol outlet tube 10 extending concentrically through almost the entire length of the internal cylindrical chamber 12 within outer cylinder 1, the chamber 12 being formed by the internal surfaces of outer cylinder parts 3, 4 and 5. Mounted concentrically within and in radially spaced relationship with respect to outer cylinder 1 is inner cylinder 14 formed by a plain cylinder part and upper and lower ends 16 and 18, respectively. The upper and lower ends 16 and 18 have central holes therethrough in which are rigidly mounted the outer races of upper and lower bearings 20 and 22, respectively, which may be ball bearings. The inner races of bearings 20 and 22 are attached in axially spaced relationship to the outer surface of aerosol outlet tube member 10. The upper end 16 of inner cylinder 14 is spaced from the inside surface of the upper end of outer cylinder 1 to provide an inlet chamber 13 in the upper portion of chamber 12 with which the lower end of aerosol inlet tube 8 communicates. The lower end of inner cylinder 14 is axially spaced from the inner surface of lower end portion 5 of the outer cylinder to provide an outlet chamber portion 15 in the lower portion of chamber 12 with which the lower end of aerosol outlet tube 10 communicates for the purpose which will be discussed hereinafter.

Figure 3:
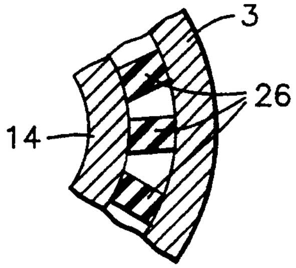
FIG. 3 is a cross-sectional view taken along line 3—3 in FIG. 1.
Figure 4:
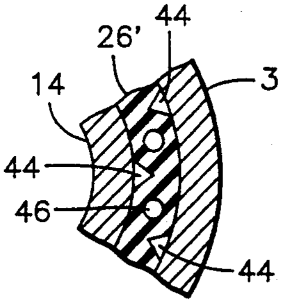
FIG. 4 is a view similar to FIG. 3 showing a different embodiment.

An annular space 24 is provided between the outer surface of inner cylinder 14 and inner cylindrical surface of outer cylinder 1. In this annular space or gap 24, herein sometimes referred to as the operating space, is at least one electrical insulating partition which may be made of teflon, plastic material, ceramic, glass, or an equivalent material, and which is attached or mounted on the outer and inner cylindrical surfaces of inner and outer cylinder members 14 and 1, respectively. The partition may be formed of a plurality of elongated strips 26 of insulating material arranged in circumferential spaced relationship to partition the annular gap 24 into two or more separate channels 25 formed by the spaces therebetween extending parallel to the central axis of the spectrometer assembly as shown in FIG. 3. As an alternative, the partition may be a cylindrical element 26' attached at its radially inner and outer surfaces to the facing surfaces of the inner and outer cylinders. In this construction, as shown in FIG. 4, elongated grooves 44 in the surfaces, and/or holes 46 through the partition, extending parallel to the central axis provide separate channels for the flow of aerosol through the annular gap 24 and provide the operating space. The function of the partition 26, 26' is to prevent the rotating aerosol from migrating to the outer cylinder wall and to establish laminar aerosol flow in the operating space in the axial direction as will be fully described hereinbelow.

Inner cylinder member 14 may be formed of any suitable material such as that described above for outer cylinder 1.

Bearings 6, 20 and 22 are sealed bearings of a suitable type such as LLU type deep groove ball bearings manufactured by NTN Bearing Co. The bearings are connected to the other parts as described above by any suitable means, such as welding, press fitting, or other suitable means known in the art.

The partition 26' or partitions 26 may be made of a suitable electrical insulating material such as teflon, plastic material, ceramic or glass and attached to the outer and inner surfaces of inner and outer cylinders 14 and 1 in any suitable manner such as by mechanical fasteners (not shown) or a suitable cement, for example. Inner cylinder member 14 may be supported on outer cylinder member 1 solely by insulating members 26 or 26', or a spoke type support may be provided interconnecting the inner and outer cylinder members (not shown).

Voltage V shown at 28, supplied by any suitable electric power source, such as a 110 or 220 volt outlet, transformer, or battery, (not shown) is connected between the cylinders by brushes 30 and 32 which make electrical contact between the inner stationary and outer rotating parts of the sealed bearings 6 and 20, so that an electrostatic force is produced across the operating space in the annular gap between the inner and outer cylinders. The brushes may be of any suitable type and may be made of suitable material such as phosphor bronze, for example. The brushes are connected between the respective cylinders and the voltage source by respective lead lines 34 and 36. The voltage V is variable by using any well known voltage control means (not shown) in the electrical circuit between source 28 and brushes 30, 32.

A suitable variable speed drive means, such as an electric motor is connected to rotor 2 to drive cylinders 1 and 14 at a selected speed for a purpose which will be understood from the description below.

The operation of the mass spectrometer of this invention will now be described.

Outer and inner cylinders 1, 14, respectively, are driven by the motor drive means to rotate around the central axis of symmetry 38 at a constant angular velocity Ω. Voltage V between the cylinders is applied via the brushes 30 and 32 so that the cylinders form electrodes. The sample aerosol is drawn, or flows, continuously at a constant flow rate through inlet tube 8 from the upper end thereof as shown by the arrow 40 out the lower end thereof into the upper portion of chamber 12 in which it flows radially outwardly to the upper end of annular gap 24, then axially in linear or laminar flow through the operating space in gap 24 to the lower portion of chamber 12, radially inwardly toward and through the lower end of outlet aerosol tube 10 and upwardly through tube 10 and out the upper end thereof as shown by arrow 42. While flowing through the operating space, the partition or partitions prevent the aerosol from rotating relative to the cylinder walls and establish linear or laminar aerosol flow in the axial direction.

The relaxation time of a particle, referred to as τ, is a measure of how quickly the velocity of the particle approaches its final value under the influence of the drag resistance of the surrounding air. For usual aerosol particles, which are smaller than 10 μm, the value of τ is shorter than $10^{-3}$S (seconds). Consequently, the particle motion in the axial and azimuthal directions reaches steady state almost immediately after the particles enter the operating space. In the steady state, the particles, sitting still in the surrounding air, rotate spirally around the axis.

A rotating particle with mass m and electric charge q tends to move in the radial direction, under the influence of centrifugal force, the electrostatic force produced by voltage V at 28, and, in case the particle has non-zero radial velocity, the drag resistance. If the electrostatic force is directed radially inwardly and cancels out the radially outward centrifugal force, the particle does not migrate in the radial direction, but moves parallel to the cylinder walls and eventually comes out of the operating space. If the cancellation is not effective, the particle migrates radially either inwardly or outwardly and is deposited on one of the walls of the cylinders 1 or 14 or of the channels of grooves 44 or holes 46. The balance of the centrifugal force against the electrostatic force is determined by the particle specific mass, m/q, and, therefore this apparatus selects particles having a specific value of m/q.

Figure 2A:
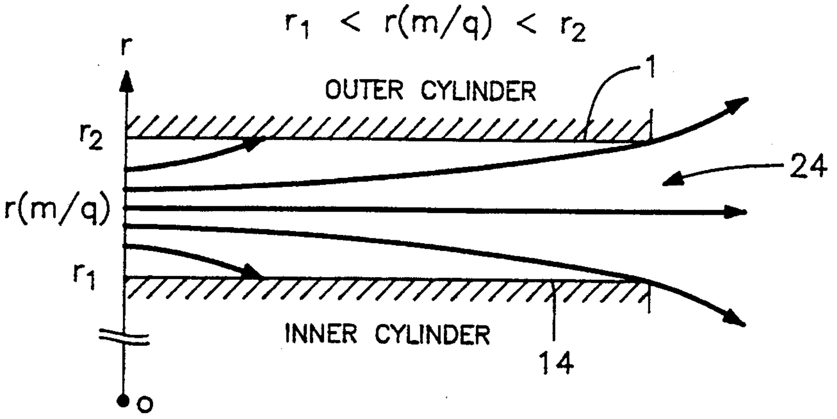
Figure 2B:
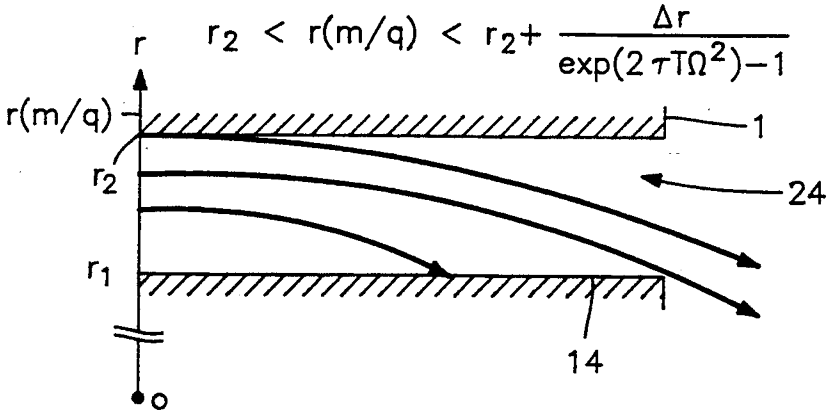
Figure 2C:
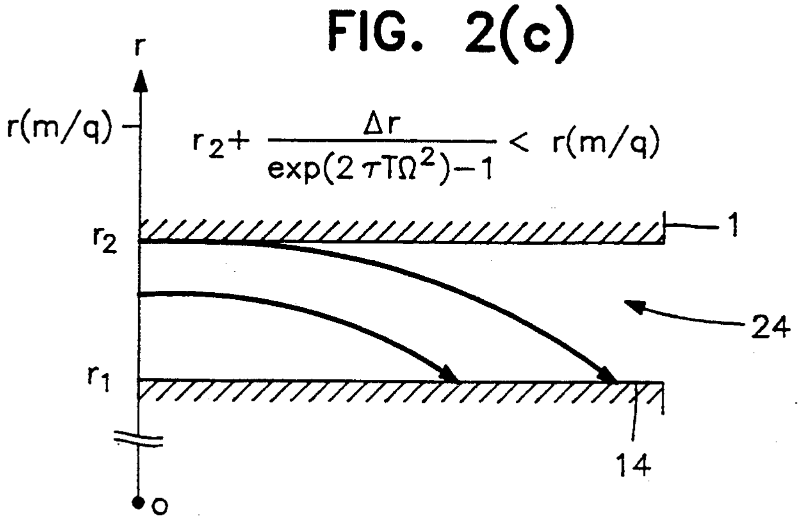

This classification process is illustrated in more detail in FIGS. 2(*a*) to 2(*c*), where some typical particle trajectories in the operating space 24 are depicted. The partition 26, 26' has been omitted for clarity. The exact cancellation of the forces occurs for a particle whose radial coordinate coincides with r(m/q) given by $$r\left(\frac{m}{q}\right) = \sqrt{\frac{V}{\Omega^2 \ln(r_2/r_1)} \cdot \frac{q}{m}}, \quad (1)$$

whereby $r_1$ is the outer radius of the inner cylinder and $r_2$ is the inner radius of the outer cylinder. In FIG. 2(*a*), r(m/q) is located between $r_1$ and $r_2$, and the particles whose initial radial coordinates are near r(m/q) can pass through the operating space. For simplicity, we assume hereinafter that the cylinder spacing $\Delta r = r_2 - r_1$ is much smaller than $r_1$ and that the velocity distribution of the medium air is uniform along r. Solving the equation of motion of particles, we can show the number of particles coming out of the operating space is the fraction $$\exp(-2\tau T\Omega^2) \quad (2)$$

of the total incoming particles, where T is the particle residence time in the operating space. The term T is determined by the aerosol flow rate Q as $$T = \frac{\pi(r_2^2 - r_1^2)L}{Q}, \quad (3)$$

where L is the length of the operating space, as shown in FIG. 1. When r(m/q) is only slightly larger than $r_2$ or slightly smaller than $r_1$, still some small fraction of particles are able to pass through the operating space as shown in FIG. 2(*b*). When r(m/q) is larger than $r_2 + \Delta r/[\exp(2\tau T\Omega^2) - 1]$ or is smaller than $r_1 - \Delta r/[\exp(2\tau T\Omega^2) - 1]$, all of the particles precipitate onto one of the cylinder walls. The center of the specific mass band thus selected by this device is given by $$\left(\frac{m}{q}\right)_c = \frac{V}{r_1 r_2 \Omega^2 \ln(r_2/r_1)}. \quad (4)$$

The width of the band relative to $(m/q)_c$ is a measure of the selectivity of the device, and is given by $$\frac{\Delta\left(\frac{m}{q}\right)}{\left(\frac{m}{q}\right)_c} = 2\coth(\tau T\Omega^2)\frac{\Delta r}{r_1}. \quad (5)$$

Figure 5:
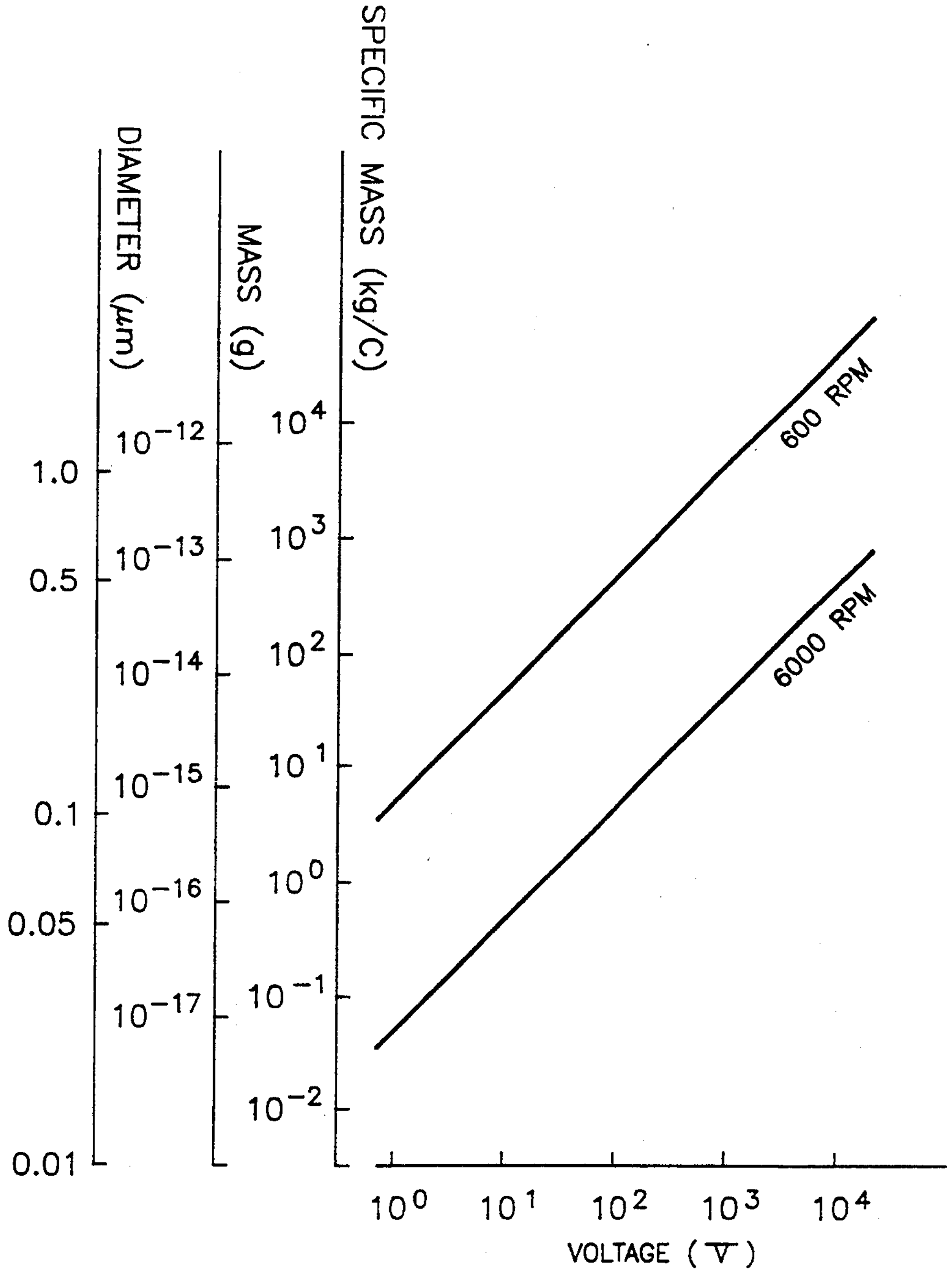
FIG. 5 is a graph showing operating characteristics of the aerosol mass spectrometer of the invention.

The value $(m/q)_c$ can be varied continuously by varying V, Ω, or both of them at the same time. As an example, FIG. 5 shows $(m/q)_c$ as a function of V for the two choices of the rotational speed, 600 RPM and 6000 RPM, and the choice of the cylinder radii $r_1 = 50$ mm and $r_2 = 51$ mm. Also shown on the ordinate are the mass m and the diameter d transformed from m/q under the assumption that the particle carries one electronic charge and that the particle density is equal to that of PSL (polystyrene latex) spheres (1.05 g/cm$^3$). The figure demonstrates that the setting of the design parameters which is required to realize particle analysis in a size range of practical interest (0.05 μm–5.0 μm in usual cases) is within feasible range. The selectivity given in Eq. (5) can be controlled conveniently through T without affecting the location of the center of the band. As T increases, the selectivity increases and, at the same time, the number of output particles decreases as known from the expression (2).

If we are interested more in particle mass than specific mass, a charge neutralizer (not shown) such as a Model 3012, 3054, or 3077 Aerosol Neutralizer manufactured by TSI Inc. for example, can be employed. The principle of operation of a charge neutralizer is described in many references, such as "Aerosol Technology" by William C. Hinds, John Wiley & Sons, New York, N.Y., pp. 302–305. By passing the aerosol through the neutralizer prior to the classification, the particle charge distribution is brought into an equilibrium state described by the Boltzmann distribution function. The mass distribution can, thereby, be inferred from the specific mass distribution just as the size distribution can be inferred from the electric mobility distribution obtained through a differential mobility analyzer (DMA).

There are two situations where the mass analysis is exceptionally straightforward. One is the case of particles smaller than 0.1 $\mu$m, in which case virtually no particles carry more than one electronic charge in the equilibrium charge state, and thus the particle mass is easily calculated from the specific mass. The other situation occurs when sample particles are nearly mono-dispersed like PSL spheres. In this case, the specific mass distribution is composed of a train of separate peaks, to each of which the number of electronic charges can easily be assigned. The transformation from specific mass to particle mass is, again, straightforward. Also particle size can usually be obtained under such situations, because the density of the particles is expected to be constant.

Since the present device is the first mass spectrometer for aerosol particles, it would be useful as a new analysis tool in such fields as aerosol science, atmospheric monitoring, and quality control in powder and spray industries. The capability of separating out and delivering a suspended aerosol to an external instrument makes this device readily adaptable to continuous and automatic analysis of aerosols. Other classifiers except the DMA have no such capability.

One example of its application in the field of aerosol science would be for non-spherical particles. The DMA gives a mobility equivalent diameter rather than a mass equivalent diameter, and the difference is considered very large for non-spherical particles. Mass distribution spectra by the present device for particles coming from the DMA would provide new information on dynamical behavior and characterization of non-spherical particles.

As a size analyzer of mono-dispersed particles, the present device could be used for development of high precision particle size standards. A major advantage of the device in this usage is that, unlike the other classifiers, the location of the center of the selected specific mass, and hence of the size, does not depend on aerodynamic quantities, such as the viscosity of the air, the Cunningham slip correction, and the sample aerosol flow rate. Accuracy is more easily attained in control or identification of mechanical or electrical quantities like the cylinder diameters, the cylinder rotational speed, and the electric voltage that are relevant to this device rather than the aerodynamic quantities. Therefore, this device could contribute to the development of the particle size standards below 0.1 $\mu$m, in which region we have not at present had suitable absolute size measurement methods.

I claim:

1. An aerosol mass spectrometer comprising:
an outer cylinder member;
a radially inner surface and internal end surfaces on said outer cylinder member forming a central chamber in said outer cylinder member;
an inner cylinder member in said central chamber having a radially outer surface radially spaced from said radially inner surface of said outer cylinder member to provide a substantially annular gap between said inner and outer cylinder members;
laminar flow producing means in said annular gap;
drive means for rotating said outer cylinder member about an axis of rotation coincident with the central axis of said outer cylinder member;
means for rotating said inner cylinder member with said outer cylinder member;
upper and lower ends on said outer cylinder member;
upper and lower ends on said inner cylinder member spaced from said upper and lower ends on said outer cylinder member, respectively, to provide an upper inlet chamber and a lower outlet chamber, respectively, between said ends communicating with said annular gap;
inlet means for flowing aerosol through said upper end of said outer cylinder member into said upper inlet chamber;
outlet means for the flow of aerosol from said lower outlet chamber to the exterior of said outer cylinder member; and
voltage means for applying a voltage between said inner and outer cylinder members to produce an electrostatic force in said annular gap, so that the aerosol to be classified flows through said inlet means into said upper inlet chamber, through said annular gap from said upper inlet chamber to said lower outlet chamber portion and through said lower outlet chamber and said outlet means, said rotation of said cylinder members produces a centrifugal force acting on said aerosol particles flowing through said annular gap, and said voltage means produces said electrostatic force on said particles in a direction substantially opposite to said centrifugal force to establish laminar aerosol flow of said particles through said annular gap.

2. The spectrometer as claimed in claim 1 wherein:
said laminar flow producing means comprises at least one electrically insulating partition means providing longitudinal channels in said gap for said laminar flow of said aerosol particles therethrough.

3. The spectrometer as claimed in claim 2 wherein:
said at least one insulating partition comprises a cylindrical element; and
said longitudinal channels comprise elongated holes through said cylindrical partition element extending substantially parallel to said central axis.

4. The spectrometer as claimed in claim 2 wherein:
said at least one insulating partition means comprises a plurality of circumferentially spaced partition elements; and
said longitudinal channels comprise the spaces between said partition elements.

5. The spectrometer as claimed in claim 1 wherein:
said aerosol inlet means comprises an inlet tube and means for rotatably mounting said inlet tube in said upper end of said outer cylinder member to facilitate relative rotation between said inlet tube and said outer cylinder member.

6. The spectrometer as claimed in claim 5 wherein: said inlet tube mounting means comprises a bearing.

7. The spectrometer as claimed in claim 5 wherein: said aerosol outlet means comprises an elongated outlet tube extending through said upper and lower ends of said inner cylinder member and through said aerosol inlet tube, and means for rotatably mounting said outlet tube in said upper and lower ends of said inner cylinder member to facilitate relative rotation between said outlet tube and said inner cylinder member.

8. The spectrometer as claimed in claim 7 wherein: said outlet tube mounting means comprises upper and lower bearings mounted in said upper and lower ends, respectively, of said inner cylinder member.

9. The spectrometer as claimed in claim 8 wherein: said voltage means comprises a voltage source, first brush means connecting said voltage source to said bearing in said upper wall of said outer cylinder member, and second brush means connecting said voltage source to said upper bearing of said inner cylinder member.

10. The spectrometer as claimed in claim 9 wherein said voltage means further comprises:
voltage control means connected to said voltage source for varying the voltage to said brush means.

11. The spectrometer as claimed in claim 1 wherein said drive means comprises:
variable speed electric drive motor means connected to said outer cylinder member; and
speed control means for varying the speed of said drive motor means.

12. The spectrometer as claimed in claim 2 wherein: said means for rotating said inner cylinder member with said outer cylinder member comprises means for connecting said at least one partition means to said inner and outer cylinder members for supporting said inner cylinder member on said outer cylinder member.

13. The spectrometer as claimed in claim 2 wherein: said insulating partition is made from a material selected from the group consisting of teflon, plastic material, ceramic and glass.

14. The spectrometer as claimed in claim 1 wherein: said inner and outer cylinder members are made from a material selected from the group consisting of steel, stainless steel, brass and aluminum.

15. The spectrometer as claimed in claim 13 wherein: said inner and outer cylinder members are made from a material selected from the group consisting of steel, stainless steel and aluminum.

16. The spectrometer as claimed in claim 1 and further comprising:
charge neutralizer means connected to said inlet means upstream of said mass spectrometer for the flow of aerosol therethrough to bring the aerosol particle charge distribution into an equilibrium state to determine particle mass.

17. A method for classifying aerosol particles comprising:
providing a mass spectrometer having radially spaced inner and outer cylinder members forming an annular operating space between the outer wall of said inner cylinder member and the inner wall of said outer cylinder member and having an inlet end and an outlet end;
rotating said cylinder members at the same rotational speed to produce a centrifugal force on said aerosol particles; and
controlling the flow of said aerosol through said annular space so that only aerosol particles having a specific mass within a range of specific masses flow through said annular space and through said outlet end thereof by applying a voltage between said inner and outer cylinders to produce a substantially radially inwardly directed electrostatic force in said operating space on said aerosol particles opposite to said centrifugal force to prevent aerosol particles having said specific mass from moving radially outwardly in said operating space a sufficient distance to contact said inner wall of said outer cylinder member.

18. The method as claimed in claim 17 wherein said controlling of the flow of aerosol comprises:
providing a pressure differential on said aerosol between said inlet and outlet ends of said operating space for inducing flow from said inlet end to said outlet end; and
preventing rotation of said aerosol in said operating space relative to said outer and inner walls of said cylinder members to induce substantially linear flow of said aerosol.

19. The method as claimed in claim 17 and further comprising:
varying said speed of rotation to vary the selection of aerosol particles having different specific masses flowing through said outlet end of said operating space.

20. The method as cl aimed in claim 17 and further comprising:
varying said voltage to vary the selection of aerosol particles having different specific masses flowing through said outlet end of said operating space.

21. The method as claimed in claim 19 and further comprising:
varying said voltage to vary the selection of aerosol particles having different specific masses flowing through said outlet end of said operating space.

* * * * *